United States Patent [19]

Ellsworth

[11] 4,368,726

[45] Jan. 18, 1983

[54] SOLAR HEATING PANEL

[75] Inventor: Robert L. Ellsworth, Granada Hills, Calif.

[73] Assignee: Fortin Laminating Corporation, Granada Hills, Calif.

[21] Appl. No.: 193,546

[22] Filed: Oct. 3, 1980

[51] Int. Cl.³ .............................................. F24J 3/02
[52] U.S. Cl. ................................... 126/445; 126/448; 126/901
[58] Field of Search ............... 126/444, 445, 448, 901; 165/172, 173, 175

[56] References Cited

U.S. PATENT DOCUMENTS

| | | | |
|---|---|---|---|
| 3,129,703 | 4/1964 | Tabor | 126/901 |
| 3,399,664 | 9/1968 | Suhay | 126/444 |
| 3,934,323 | 1/1976 | Ford | 126/448 |
| 4,011,190 | 3/1977 | Telkes | 126/901 |
| 4,023,556 | 5/1977 | Sarazin | 126/445 |
| 4,030,478 | 6/1977 | Beaver | 126/448 |
| 4,031,881 | 6/1977 | Thiel | 126/448 |
| 4,046,136 | 9/1977 | Izumi | 126/448 |
| 4,055,707 | 10/1977 | McDonald | 126/901 |
| 4,082,907 | 4/1978 | Schardein | 126/901 |
| 4,089,324 | 5/1978 | Tjaden | 126/444 |
| 4,265,225 | 5/1981 | Berger | 126/448 |
| 4,292,958 | 10/1981 | Lee | 126/448 |

FOREIGN PATENT DOCUMENTS 2308064 12/1976 France .............................. 126/445

*Primary Examiner*—Daniel J. O'Connor

[57] ABSTRACT

A solar heating panel for collecting solar heat energy and method for making same having a heat insulative substrate with a multiplicity of grooves and structural supporting ribs formed therein covered by a thin, flexible heat conductive film to form fluid conducting channels which in turn are connected to manifolds from which fluid is directed into the channels and heated fluid is removed therefrom.

8 Claims, 8 Drawing Figures

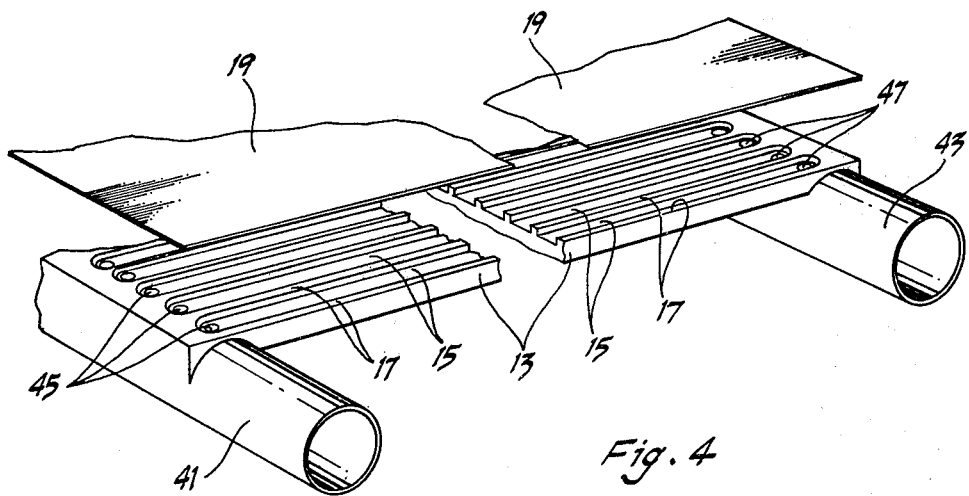

Fig. 4

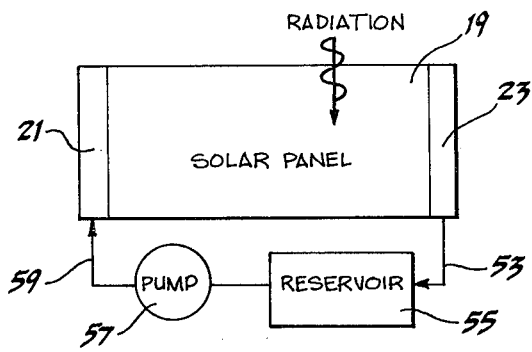

Fig. 5

| FABRICATING FLAT SUBSTRATE |
| FORMING GROOVES INTO FLAT SUBSTRATE |
| COVERING GROOVES WITH HEAT TRANSMITTING FOIL |
| ATTACHING MANIFOLDS TO COVERED GROOVES |

Fig. 6

| FORMING FLAT SUBSTRATE WITH CHANNELS |
| COVERING CHANNELS WITH HEAT TRANSMITTING FOIL |
| ATTACHING MANIFOLDS TO COVERED CHANNELS |

Fig. 7

| MOLDING FLAT SUBSTRATE WITH INTEGRAL GROOVES AND MANIFOLDS |
| FORMING OPENINGS BETWEEN GROOVES AND MANIFOLDS |
| COVERING GROOVES WITH HEAT TRANSMITTING FOIL |

Fig. 8

SOLAR HEATING PANEL

This invention relates to a solar heat collector and more particularly, to solar heat exchange panels which are self-supporting, lightweight and highly efficient and to methods of fabricating such panels.

Solar heating panels are well-known and are used to transform solar radiant energy into a heated fluid. They are usually in the form of rigid flat plate collectors without radiation concentration such as that provided by mirrors and reflective surfaces. Conventional flat plate collectors of solar energy have a solar energy absorbing surface and means for transferring the absorbed energy to a fluid. The solar energy absorbing surface typically is a metal sheet or plate having one side blackened to form an energy absorbing surface and the other side connected to a plurality of tubes through which fluid to be heated is conducted. In addition, there may be an envelope which is transparent to solar radiation placed over the solar absorbing surface to reduce convection and conduction losses.

There have been a variety of suggested constructions for solar energy collectors, some of which have met with limited success. However, one of the primary obstacles still presented is that these constructions are relatively expensive, not only to manufacture, but to transport, handle, and to install. Generally, the collectors are exposed to the elements at all times which has required the use of expensive materials and construction to resist environmental deterioration. Attempts to lower the cost of materials and construction have resulted in poor thermal efficiency. The overall effect of these problems is that solar collector installations generally require a very substantial initial financial investment and require a long period over which to recover and recapture the initial investment. Those concerned with the development of solar panels have long recognized the need for a simple, low-cost flat plate collector. The present invention fulfills this need and substantially overcomes these cost difficulties.

Generally, the solar panel constructions require a frame or a supporting structure to hold and contain the absorber plate and fluid conducting tubes connected therewith. This is required because of the light weight construction of the absorber plate and fluid conducting tubes in order to reduce the thermal mass thereof. This supporting structure generally adds weight and bulk to the solar panel making it difficult to transport and handle.

Solar collector panels available on the market consist of several components including a collector box, a cover plate, an absorber plate in a mounting block, a cover assembly and various mounting and assembly fixtures. A typical panel of 3×7 feet weights approximately 190 pounds. The present invention utilizes a lightweight self-supporting structure and in most applications does not require a collector box or thermal enclosure which overcomes the problems of structural weight posed by the available solar panels.

One of the most critical problems confronting designers of solar panels has been the force created by heat expansion and contraction of the panel components due to temperature changes. The heat collectors heretofore have been a complicated structure comprising insulation, sheet metal and plastic or glass. The extreme temperature changes have caused shattering of a solar heat collector, as well as extreme bowing and twisting. The structure of the present invention overcomes this problem.

The general purpose of this invention is to provide a solar heating panel which embraces all the advantages of similarly employed flat solar heat collectors and possesses none of the aforedescribed disadvantages. To obtain this, the present invention contemplates a unique structural configuration of the solar energy absorbing surface and the underlying fluid conducting conduits whereby the problems of thermal expansion and the need for a costly and expensive supporting structure with bulky thermal insulation are avoided.

An object of the present invention is the provision of a solar panel which is structurally self-supporting, environmentally rugged and thermally efficient.

Another object is to provide a solar panel having a heat insulative substrate which is self-supporting and readily made from printed circuit board substrates bonded together in an epoxy resin.

Yet another object of the present invention is the provision of a low cost flat panel solar collector having a self-supporting insulative substrate easily molded from epoxy resin.

A further object of the invention is the provision of a lightweight, self-supporting solar panel which is made of low cost materials and is easily fabricated and constructed and has a high efficiency in transmitting solar energy into fluid temperature.

Still another object is to provide a flat panel solar collector which is readily adapted to be used in modular configurations to form larger panels.

A still further object is the provision of a solar heating panel which may be constructed according to molding and laminating processes well known to printed circuit industries.

Other objects and many of the attendant advantages of this invention will be readily appreciated as the same become better understood by reference to the following detailed description when considered in connection with the accompanying drawings in which like referenced numerals designate like parts throughout the figures thereof and wherein:

FIG. 4 is an exploded perspective view, partly cut away, of an alternate embodiment of the invention;

FIG. 5 illustrates a block diagram of a heating system utilizing the present invention;

FIG. 6 illustrates a method for making the invention of FIG. 1;

Figure 1:
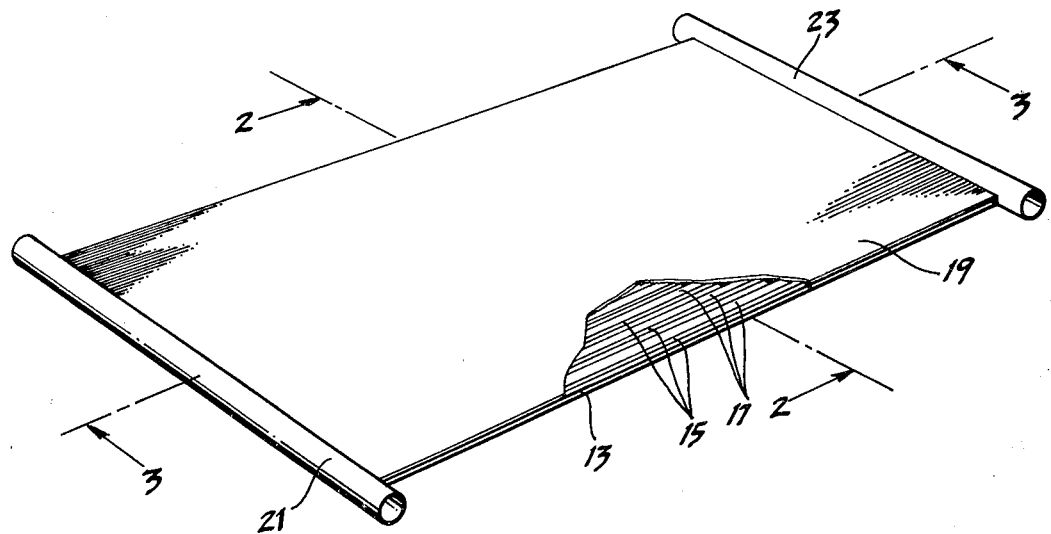
FIG. 1 shows a perspective view, partly cut away, of a preferred embodiment of the invention.

FIG. 7 describes an alternate method for making the invention of FIG. 1;

FIG. 8 illustrates a method for making the invention of FIG. 4.

Referring now to the drawings, wherein like referenced characters designate like or corresponding parts throughout the several views, there is shown in FIG. 1 (which illustrates a preferred embodiment) a solar heating panel 11 having a heat insulative substrate 13 having a multiplicity of grooves 15 formed therein in substantially parallel alignment with a plurality of structurally supporting ribs 17 dispersed therebetween. Grooves 15 are covered by a thin flexible heat conductive film or foil 19 which is laminated or bonded by a bonding cement such as epoxy to ribs or ridges 17 thereby forming fluid conducting channels. At one end of solar panel 11 a fluid conducting manifold 21 is attached in the form of a cylindrical pipe having a slot therealong into which the end of substrate 13 and thin film 19 attached thereto are inserted and sealed therein to form a fluid tight assembly by which the interior of manifold 21 communicates with each of the fluid conducting channels formed by grooves 15 and thin film 19. Similarly, a fluid conducting manifold 23 is connected to the other end of the combination of substrate 13 and thin film 19.

Figure 2:
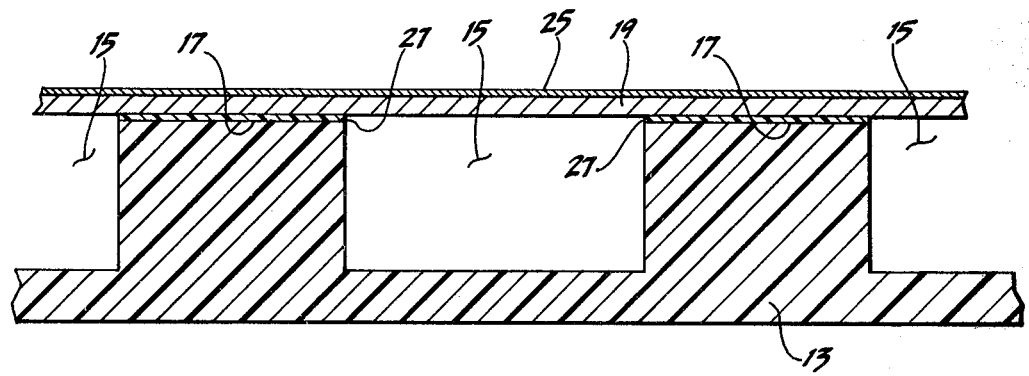
FIG. 2 illustrates a cutaway section of the invention taken on the line 2—2 of FIG. 1 looking in the direction of the arrows.

FIG. 2 shows a portion of a cross-section view of substrate 13 with thin film 19 adhered thereto. Substrate 13 is shown as composed of a heat insulative material such as epoxy resin or fiberglas having grooves 15 therein of rectangular cross-section separated by ribs which in turn have a coating of bonding cement 27 to which heat conductive thin film 19 is in adhesive attachment. Thin film 19 is further illustrated as having a solar energy collecting surface 25 coated thereon.

It is to be noted that a typical configuration of the present invention contemplates groove 15 as having dimensions of approximately $\frac{1}{8}$ of an inch in width by 3/32 of an inch in depth with approximately 32 grooves per foot of width across panel 11. Typically, thin film 19 may be a fraction of a thousandth to several thousandths of an inch thick, depending upon the material being used. The materials contemplated for thin film 19 are foils of copper, aluminum, and nickel.

Figure 3:
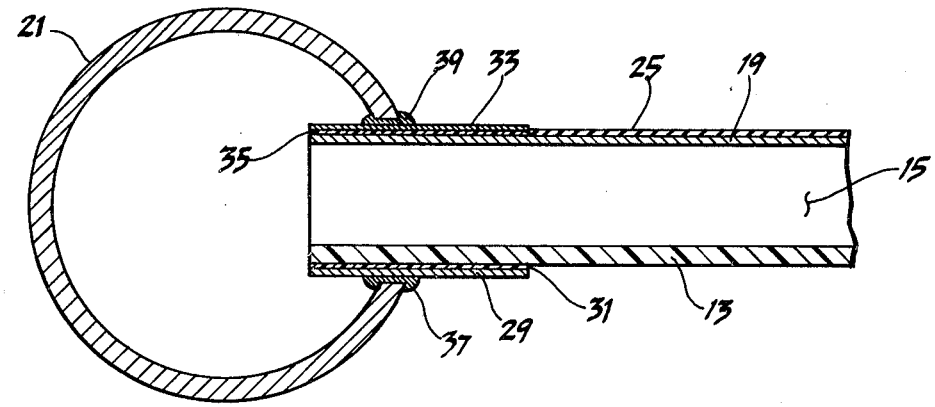
FIG. 3 illustrates a cutaway section of the invention taken on the line 3—3 of FIG. 1 looking in the direction of the arrows.

FIG. 3 shows a cross-section of the invention of FIG. 1 taken across manifold 21 and illustrates the manifold attachment to substrate 13 and thin film 19. In one embodiment of the invention, it is contemplated that manifold 21 be fabricated from copper tubing and to be soldered to the ends of the solar panel. To accommodate this fabrication, a metal or copper strip 29 as shown in FIG. 3 is adhesively bonded to the bottom side of substrate 13 (the side with no grooves) by a bonding cement 31. Similarly, if thin film 19 is aluminum, a copper strip 33 is adhesively attached to thin film 19 adjacent the end of the solar panel and oppositely disposed from metal strip 29. The upper edge of the slot cut into manifold 21 is attached to copper strip 33 by a solder bead 39. Similarly, the bottom edge of the slot in manifold 21 is attached to copper strip 29 by a solder bead 37. Solder beads 37 and 39 structurally attach manifold 21 to the panel and seal the juncture against fluid leakage.

FIG. 4 shows an alternate embodiment of the invention in which the end manifolds are integrally molded and formed to the heat insulative substrate in a unitized construction. Heat insulative substrate 13 with grooves 15 separated by ribs or ridges 17 is integrally molded at one end to a fluid conducting manifold 41. Similarly, the other end of substrate 13 is integrally molded to a fluid conducting manifold 43. Thin film 19 is adhesively attached to ribs 17 as described in connection with the invention of FIG. 1 and completely encloses and covers grooves 15. Since manifolds 41 and 43 are integrally molded to substrate 13, it is necessary to form holes 45 in manifold 41 and holes 47 in manifold 43 in order to communicate from the interior of manifolds 41 and 43 to the grooves 15 which become fluid conducting channels when sealed by thin film 19. Holes or openings 45 and 47 may be formed by drilling prior to the bonding of thin film 19. A molding material such as epoxy resin may be utilized to cast the integrally molded substrate and manifold structure of FIG. 4.

FIG. 5 illustrates a block diagram of a heating system incorporating the solar panel of the present invention. Fluid is conducted out of manifold 23 by a conduit 53 into a fluid reservoir 55 where the fluid heated by the solar panel is stored for use. Fluid is pumped from the reservoir by pump 58 into manifold 21 by fluid conduit 59 where it flows through the solar panel and is heated and then exits via manifold 23 and fluid conduit 53 back into reservoir 55, where the process is repeated. Although there are many heat system configurations which are contemplated for the present invention, the system of FIG. 5 is merely given to illustrate one of such applications.

FIG. 6 describes a method for making the invention of FIG. 1 comprising the steps of fabricating a flat substrate; forming grooves into said flat substrate; covering the grooves with a heat transmitting foil; and attaching fluid conducting manifolds to the covered grooves.

An alternate method for making the invention of FIG. 1 is described in FIG. 7 comprising the steps of forming a flat substrate with channels; covering said channels with heat transmitting foil; and attaching fluid conducting manifolds to said covered channels.

In FIG. 8 there is described a method for making the invention described in FIG. 4 comprising the steps of molding a flat substrate with integral fluid conducting grooves and manifolds; forming openings between the grooves and the manifolds; and covering the grooves with a heat transmitting foil to form fluid conducting channels.

The operation of the present invention is best described by first referring to FIG. 5. Fluid is pumped into manifold 21 where it traverses the grooves in the substrate of the solar panel which are covered by a thin heat conductive film and then exits to manifold 23. Solar or heat radiation directed onto the thin film is conducted through the film to the fluid flowing beneath.

Turning now to FIG. 2, the heat collecting properties of thin film 19 are enhanced by heat absorbing coating 25. If thin film 19 is a copper foil, heat absorbing coating 25 may be a black coating consisting of black copper oxide or black chrome or the like. If thin film 19 is aluminum foil, heat absorbing coating 25 may be black anodized aluminum or the like. If thin film 19 is nickel, heat absorbing coating 25 may be a black selective surface designed for high efficiency solar energy collection as provided by a solar foil manufactured by Ergenics, a division of MPD Technology Corporation, Wyckoff, New Jersey. According to the manufacturer, the black surface on thin nickel foil gives the solar foil an outstanding combination of high absorptance, low emittance and high resistance to humidity and thermal degradation. The solar foil is supplied pre-coated with a high temperature, pressure sensitive adhesive by which it may be bonded to the heat insulative substrate 13.

Because of the rib and groove construction of substrate 13, the substrate is self-supporting by the strength, rigidity and stiffness imparted to it by the ridged construction. Panels made in dimensions of 3×6 feet are structurally self-supporting and are easily handled without breaking as well as being light in weight.

The thin film heat transmitting foil 19 has a very low thermal mass and, therefore, can be operated at lower temperatures than the heat absorbing surfaces of other solar panels having greater thermal masses. A large number of grooves 15 with thin ridges 17 therebetween reduces the heat transfer path laterally in foil 19 from the center of a ridge to the area covering the adjacent groove.

The unitized molded structure of FIG. 4 makes possible a low cost structure requiring only the application of thin film heat transmitting foil 19 to complete the assembly.

It should be noted that the substrate of FIG. 1 may be molded of epoxy resin formed around scrap pieces of epoxy or fiber-glass printed circuit boards, the scraps being used as a filler. Grooves 15 then may be machined into the surface of the composite molded flat sheet. This method provides a source of low cost substrates from manufacturers who are in the printed circuit board fabrication industry.

Another method for fabricating the substrate of FIG. 1 is to mold the substrate and grooves in one molding operation using an epoxy resin as the molding material and as set forth in the first step of FIG. 7. This eliminates the machining of the grooves as required in the prior method which is the first step set forth in FIG. 6.

Solar panels constructed according to the present invention have been constructed and compared with available equivalent solar panels. Results of testing have indicated at least a 5% to 10% increase in efficiency.

It now should be apparent that the present invention provides a mechanical structure which may be employed in conjunction with a solar heat collector panel for decreasing costs, decreasing weight, increasing strength, and increasing the efficiency compared to solar panels utilized heretofore.

Although particular components, etc., have been discussed in connection with specific embodiments of solar panels constructed in accordance with the teachings of the present invention, others may be utilized. Furthermore, it will be understood that although exemplary embodiments of the present invention have been disclosed and discussed, other applications and mechanical configurations and arrangements are possible and that the embodiments disclosed may be subjected to various changes, modifications and substitutions without necessarily departing from the spirit of the invention.

What is claimed is:

1. A solar panel comprising:
   a self-supporting heat insulative substrate having two ends and a multiplicity of substantially parallel grooves formed on one side of said substrate between said ends with structurally supporting ribs spaced therebetween;
   a flexible thin heat conductive foil formed of a first metal material attached to and supported by said ribs of said insulative substrate and covering said multiplicity of grooves on one side of said substrate to form fluid conducting channels, said thin flexible heat conductive foil transmitting heat energy incident thereon to fluid flowing in said fluid flowing conduits;
   a pair of thin foil strips formed of a second metal material different from said first metal material, one of said strips attached to said one side of said substrate adjacent each of said ends of said substrate and the other one of said pair of strips attached to the other side of said substrate adjacent each of said ends of said substrate; and
   a fluid conducting manifold formed from said second metal material attached to each end of said substrate and communicating with said fluid conducting channels, said fluid conducting manifold having a slot therealong, said slot having one edge soldered to said one of said foil strips attached to said one side of said substrate and the other edge soldered to said other one of said foil strips attached to the other side of said insulative substrate whereby one fluid conducting manifold introduces fluid into said fluid conducting channels and the other fluid conducting manifold receives heated fluid therefrom.

2. The solar panel described in claim 1 further including a fluid conducting manifold integrally formed and bonded to each end of said heat insulative substrate, said fluid conducting manifold having openings therethrough which communicate with each of said fluid conducting channels for introducing fluid thereinto at one end of said heat insulative substrate and receiving heated fluid therefrom at the other end of said heat insulative substrate.

3. The solar panel described in claim 1 wherein said heat conductive foil is coated with a solar energy collecting surface.

4. The solar panel described in claim 3 wherein said first metal material is aluminum and said solar energy collecting surface is black anodized aluminum.

5. The solar panel described in claim 3 wherein said first metal material is nickel and said solar energy collecting surface is a black selective heat collecting material.

6. The solar panel described in claim 3 wherein said first metal material is copper and said solar energy collecting surface is a black heat absorbing coating.

7. The solar panel described in claim 6 wherein said black heat absorbing coating is black chrome.

8. A solar panel comprising:
   a self-supporting heat insulative substrate formed of an epoxy resin having two ends and a multiplicity of substantially parallel grooves formed on one side of said substrate between said ends with structurally supporting ribs spaced therebetween;
   a flexible thin sheet of metal foil attached to and supported by said ribs of said insulative substrate and covering said multiplicity of grooves on one side of said substrate to form fluid conducting channels said thin flexible sheet of metal foil transmitting heat energy incident thereon to fluid flowing in said fluid flowing conduits;
   a strip of metal foil attached to the other side and adjacent each of said ends of said insulative substrate; and
   a fluid conducting manifold attached to each end of said insulative substrate and communicating with said fluid conducting channels, said fluid conducting manifold having a slot therealong, said slot having one edge joined to said sheet of metal foil attached to said one side of said insulative substrate and having the other edge joined to said strip of metal foil attached to said other side of said insulative substrate whereby one fluid conducting manifold introduces fluid into said fluid conducting channels and the other fluid conducting manifold receives heated fluid therefrom, said fluid conducting manifold and said strip of metal foil are copper and said sheet of metal foil is aluminum further including a second strip of copper metal foil laminated and bonded to said sheet of metal aluminum foil adjacent the ends of said insulative substrate, said one edge of said fluid conducting manifold being soldered to said strip of copper metal foil on said other side of said insulative substrate and said other edge of said fluid conducting manifold being soldered to said second strip of copper metal foil bonded to said aluminum metal foil on said one side of said insulative substrate.

* * * * *